Jan. 10, 1967   F. V. CUNNINGHAM   3,297,282
KITE
Filed Nov. 12, 1963   2 Sheets-Sheet 1
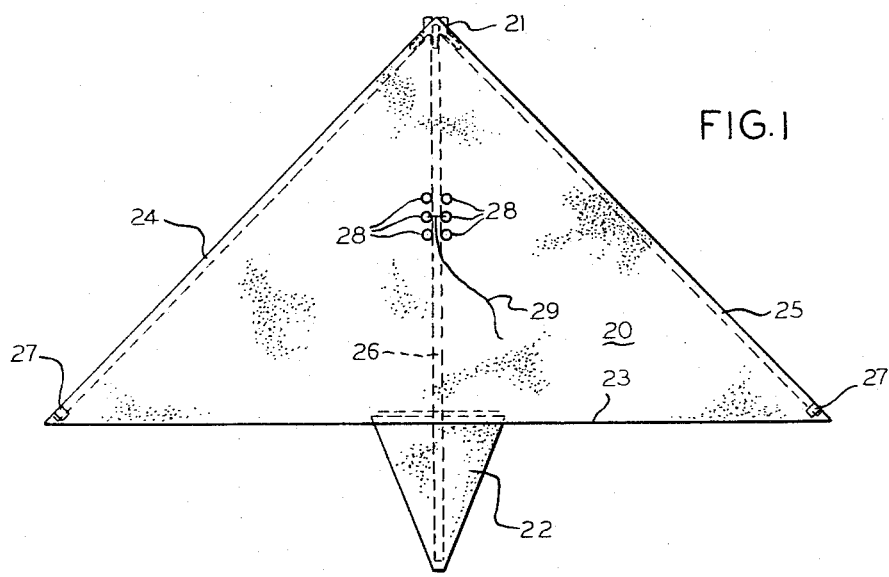
FIG.1
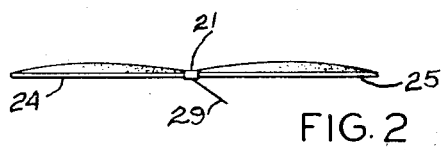 FIG.2    FIG.3
FIG.4 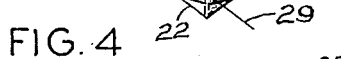   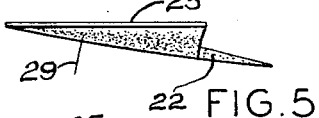 FIG.5
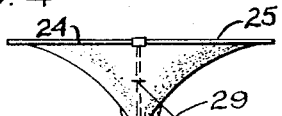 FIG.6   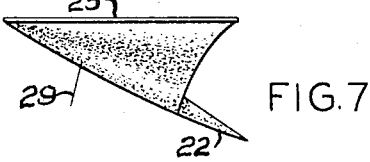 FIG.7
FIG.8 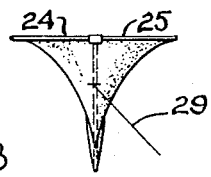   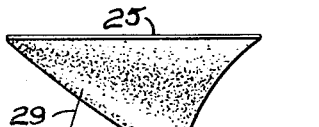 FIG.9
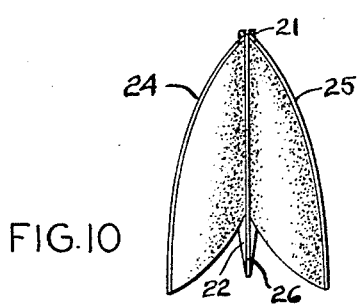 FIG.10   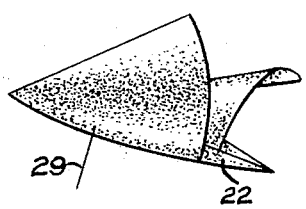 FIG.11
INVENTOR.
Francis V. Cunningham
BY Malcolm S. Bradway
ATTORNEY Jan. 10, 1967  F. V. CUNNINGHAM  3,297,282
KITE
Filed Nov. 12, 1963  2 Sheets-Sheet 2

INVENTOR.
BY *Francis V. Cunningham*

*Malcolm S. Bradway*
ATTORNEY

United States Patent Office 3,297,282
Patented Jan. 10, 1967

3,297,282
KITE
Francis V. Cunningham, 5316 Central,
Western Springs, Ill. 60558
Filed Nov. 12, 1963, Ser. No. 322,709
16 Claims. (Cl. 244—153)

The present invention is directed to new and useful improvements in airborne devices such as kites or gliders.

The major purposes of the present invention are to provide a kite which may be simply and inexpensively manufactured, to so construct a kite that the kite body may deform with varying wind conditions so as to vary the effective lift area of the kite with changing wind forces thereby tending to hold the necessary control forces exerted by a control line substantially the same thus reducing the chances of burning and cutting of the fingers holding a tethering string due to great increases of force occurring with sudden gusts of wind, while at the same time permitting use of relatively light weight control lines, the kite body being so formed that the flexure or deformability of the kite body tends to produce a flapping or bird-like action of the side sections or wings of the kite due to gusty winds or under control of the operator by jerking on the control line, the kite body also being so formed that it is conveniently folded for shipment or storage.

A related purpose of the invention is to so construct a kite body with a connection for spaced stiffeners of the kite that allows the stiffeners, connection and kite body to be collapsed without damage thereto when the stiffeners are accidently forced toward one another.

These and other purposes will become more apparent in the course of the ensuing specification and claims when taken with the accompanying drawings in which:

FIGURE 1 is a plan view of a typical kite embodying the principles of the present invention;

FIGURE 2 is an end view of the kite illustrated in FIGURE 1 and looking in the direction of the plane of the side edges of the kite, while illustrating one flying condition of the kite of FIGURE 1;

FIGURE 3 is a side view of the kite as illustrated in FIGURE 2;

FIGURE 4 is a view similar to FIGURE 2, but illustrating the kite in a different flying condition;

FIGURE 5 is a side view of the kite shown in FIGURE 4;

FIGURE 6 is a view similar to FIGURE 2 but illustrating a still different flying condition of the kite;

FIGURE 7 is a side view of the kite illustrated in FIGURE 6;

FIGURE 8 is still another view similar to FIGURE 2, while illustrating a still different flying condition of the kite;

FIGURE 9 is a side view of the kite shown in FIGURE 8;

FIGURE 10 is a bottom view of the kite illustrated in FIGURE 8;

FIGURE 11 is a perspective view of the kite illustrated in FIGURES 8, 9 and 10;

Like elements are designated by like characters throughout the specification and drawings.

Figure 12:
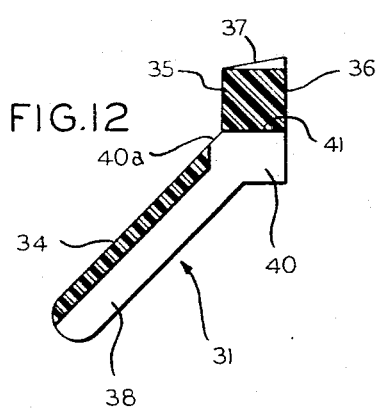
FIGURE 12 is a sectional view of a connecting element utilized in the kite of the present invention.
Figure 13:
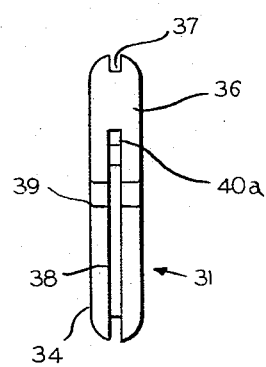
FIGURE 13 is a side view of the element shown in FIGURE 12.

With particular reference now to the drawings, and in the first instance to FIGURE 1, numeral 20 indicates a kite body which may be generally defined from fabric cut to a desired configuration. The fabric may be paper, plastic film or other conventional materials utilized in the manufacturer of kites. In the form of the invention illustrated, the kite fabric is cut so as to have a generally triangular form with an apex 21 at the top thereof. The kite fabric preferably includes a section 22 of inverted triangular form and of smaller dimensions than the remainder of the kite, the section 22 defining a tail-like section. The section 22 is positioned centrally of the kite body and may be a part of the kite body itself or it may constitute a separate piece which is fixed to the lower edge 23 of the kite fabric through any suitable means such as adhesive or suitable tape.

Stiffening strips 24 and 25 are fixed to the side or leading edges of the kite body and extend from the apex 21 substantially throughout the length of the leading edges. A medial stiffening strip 26 is positioned so as to bisect the angle defined by the strips 24 and 25 and may extend from the apex 21 of the kite to a point adjacent to the lower-most portion of the tail section 22. The strips 24, 25 and 26 are in the form of elongated and narrow strips which are sufficiently flexible as to allow bending thereof. Thin, lightweight plastic tubing is suitable for use in making the strips 24, 25 and 26. The strips should be sufficiently rigid so that they maintain their essentially rectilinear form, without application of external forces, while being capable of flexure to a curvilinear position under application of forces as may be encountered during flying conditions of the kite. The strips 24, 25 and 26 may be joined to the kite fabric in the positions illustrated in the drawings through use of suitable adhesive or through use of adhesive tape as is designated at 27.

A series of equally spaced apertures 28 are positioned alongside the central stiffener 26 on both sides thereof so as to allow a tethering or control line 29 to be attached to the kite by simply tying one end of the line around the central stiffener 26. This series of apertures should be positioned slightly above the midpoint of the stiffener 26 in the form of kite illustrated in FIGURE 1.

In accordance with the principles of the invention, the side and central stiffeners 24, 25 and 26 are so connected as to allow yieldability or pivoting of the central stiffener from a position substantially coplanar with the side stiffeners 24 and 25 to positions variantly spaced therefrom so as to define, with the side stiffeners, an essentially V-shaped cross section of the kite body, as is illustrated by the variant conditions of the kite body in FIGURES 2 through 11, inclusive. At the same time, these stiffeners are all connected in such a fashion that the extreme upper (or forward) portions of the side stiffeners are held in essentially the same plane while the remaining portions of the side stiffeners 24 and 25 may yield, resiliently toward and away from the central region of the kite. Wind forces cause the stiffeners 24 and 25 to bend toward the central region while the resistance of the stiffeners to bending causes the stiffeners to attempt to maintain their essentially rectilinear position as in FIGURE 1. The side stiffeners are unrestrained in this bending movement except for such restraint as is imposed by the fabric of the kite body itself, the inherent resistance to bending of the stiffeners, and that which is imposed by the connection at the apex 21 of the kite.

The apex connection for the kite is particularly illustrated in FIGURES 12 through 17, inclusive. This connection is so formed as to provide three leg portions which are connected to the stiffeners 24, 25 and 26, and with the connection to the central stiffener 26 capable of hinging movement relative to the stiffeners 24 and 25 while the upper end portions of the stiffeners 24 and 25 are held in essentially the same plane and at an angle to one another as is seen in FIGURE 1. The connection is also so formed as to allow a detachable connection of the three stiffeners through desired disassembly and through collapse due to accidental impact of the sides of the kite with some object.

Figure 14:
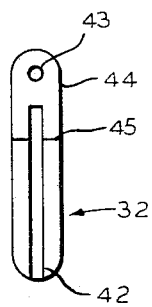
FIGURE 14 is a plan view of another connecting element utilized in the present invention.
Figure 15:
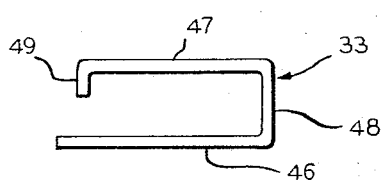
FIGURE 15 is a plan view of another connecting element used with the elements of FIGURES 12 and 14.

The connection preferably includes two side elements 31 which are identically formed and which are shown in FIURES 12 and 13, a medial hinge element 32 which is shown in FIGURE 14, and a hinge and retaining pin 33 which is shown in FIGURE 15. Each of the elements 31 and 32 may be conveniently formed from molded plastic and may be relatively rigid to hold the stiffeners in the relationship aforesaid, while the hinge and retaining element 33 may be formed of spring wire.

The side elements 31 include leg portions 34, which are inclined to a body portion 35. Body portion 35 has a flat surface 36 which is adapted to be positioned against or adjacent to the center element 32. The top of the body portion 35 has a slot 37 formed therein. Leg portion 34 is preferably formed as a hollow tube and with a slot 38 formed in the lower portion of the tube and throughout the length thereof. The slot allows the body of the leg to be compressed slightly when the stiffening tubes 24 and 25 are fitted over the legs.

The leg portions 34 are formed as rounded sections through the substantial part of their length while having a more or less square cross section 39 at the under portion of the legs near the juncture of the legs with the body portions of the elements. The shoulders 39 serve to limit movement of the stiffening tubes over the legs and provide abutment surfaces for the end edges of the tubes.

The slots 38 are formed rectilinearly and extend throughout the entire length of the legs and through the lower part of the body portion 35. Thus, the slot provides a downwardly open recess 40 which can receive the hinge pin 33, with the recess terminating in an upper surface 41 which is adapted to bear against the hinge pin 33.

The center section of the connector is illustrated in FIGURE 14 and is formed as a tubular section with a slot 42 extending longitudinally thereof throughout a substantial portion of the length of the element and a hinge pin receiving aperture 43 extending transversely of the length of the section and in the upper portion of the element. Slot 42 allows slight compressibility of the section so as to facilitate reception of the tubular medial stiffener. The upper portion of the element may have a square cross section as at 44 thereby providing a shoulder 45 defining an abutment surface against which the end edge of the center stiffener may abut when the center stiffener tube is slipped over the lower portion of the element. The connector is assembled with the stiffening tubes by simply sliding the tubes over the rounded portions of the sections so that the tubes are frictionally held thereto. If desired, adhesives may be used to fix the strips to the sections of the connector.

The hinge pin 33 is shown in FIGURE 15 and is formed as a reversely bent or more or less U-shaped element providing a straight hinge portion 46 for insertion within the apertures 43 and 40 of the connecting elements, and another leg 47 extending from a bight portion 48, which leg 47 is adapted to overlie and be received within the slots 37 of the side connecting elements. Portion 47 terminates at the end thereof in a bent portion 49 extending toward portion 46.

Figure 16:
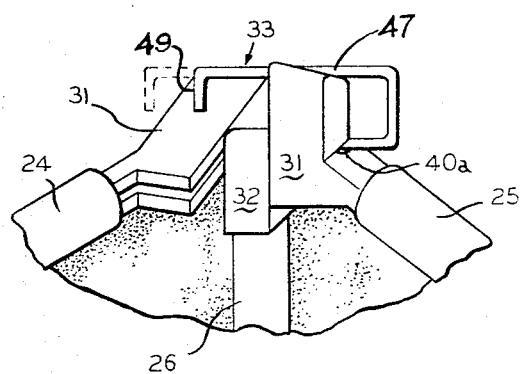
FIGURE 16 is a diagrammatic illustration showing a method of assembling the elements of FIGURES 12, 13 and 14.
Figure 17:
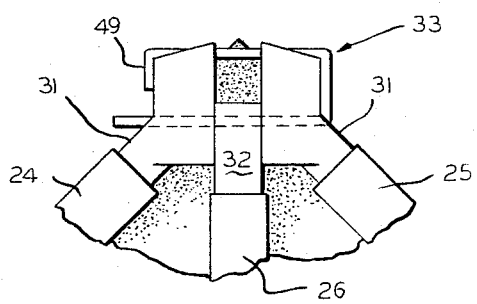
FIGURE 17 illustrates the elements of FIGURES 12, 13 and 14 in the assembled condition.

The apex connector is assembled by inserting the hinge portion 46 through one aperture 40a in one side section as seen in FIGURE 16, with the retaining portion received within the slot 37 of that side element. The hinge portion 46 is passed through aperture 43 of the center element and through the recess 40 and aperture 40a of the other element so that in the assembled position, as seen in FIGURE 17, the center stiffener 26 is hingedly connected to the side elements 31 and may swing about the hinge and retaining element 33. The upper portion 47 of the retaining element 33 is received within the slots of the side connectors and holds the portion 46 tightly against the bearing surfaces 41 of the side elements. The bent portion 49 bears snugly against the side of body portion of one of the side elements 31 as seen in FIGURE 17 thereby holding the three stiffeners in the assembled and hinging relation illustrated.

In use, the control line or string is tied directly to the center element 26 as by simply looping the line through two of the apertures 28 and around the stiffener 26, followed by tying. The line is preferably tied through the center apertures illustrated in FIGURE 1 for flying in relatively moderate winds. The line may be passed through the upper apertures when the kite is flown in relatively light winds. The line may be affixed to the lower apertures for flying in relatively heavy winds. This adjustment of the tethering or control line longitudinally of the kite for varying wind conditions eliminates the need for tail streamers which, in conventional kites, are conventionally added for stability of a kite.

With the control line attached, the kite may become airborne by running with the string as is customary, or in the event that the wind forces are sufficient, merely releasing the kite for ascension with the wind forces. In flight, the kite body may assume the various configurations illustrated in FIGURES 2 through 11, inclusive. The kite fabric is approximately the same dimensions as the area described by the three stiffeners 24, 25 and 26. The kite fabric between the central and side stiffeners assumes the shape of conic sections due to the slight yieldability of the fabric and yieldability of the stiffeners 24, 25 and 26. It may be noted in this regard that the apex connection at 21 holds the upper portions of the three stiffeners in the angular position illustrated in FIGURE 1 while the substantial lengths of the stiffeners may undergo flexing movement with respect to the upper portions. It may be further noted that the side stiffeners 24 and 25 may flex so as to provide a curvilinear disposition as is seen in the drawings particularly in FIGURES 10 and 11. This flexing of the side stiffeners allows the side sections to move rearwardly so as to reduce the effective lift area of the kite opposed to the wind. This flexing of the side sections may occur with the wind forces. The greater the wind forces, the greater the flexing, so that variations in force exerted on the control line are minimized since the lift area of the kite is effectively reduced with increased wind forces. This feature of the kite allows the use of lighter control lines, even when the kite is used in relatively heavy winds. It also reduces the chances for burning and cutting of fingers holding the line which may occur when sudden gusts of wind tend to increase the pull on the string to the point where the string tends to be pulled through the hand of the user.

This same capability of flexure allows a flapping action of the side sections of the kite, to more or less resemble the flapping wing action of a bird. This flexure may be such as to diminish the distance between the side stiffeners to less than half of the distance shown in FIGURE 1 wherein the stiffeners are in the unflexed position, to the flexing in some cases being such that the rear ends actually touch or cross one another.

The various flight configurations of the kite are illustrated in FIGURES 2 through 11 inclusive. FIGURE 2 illustrates the general disposition of the kite just prior to a vertical dive. In this position, the central stiffener has moved to a plane which is essentially common with the plane of the side stiffeners. From this position, a slight down draft, as may be caused by falling air currents or releasing the control line, causes the wings or side sections of the kite to drop faster than the central reinforcing member, thus causing the kite to nose down into a dive.

FIGURES 4 and 5 illustrate the kite in normal stable flight conditions. In this position, the central element is moved outwardly from the general plane of the side elements while the fabric between the central element and side elements assumes generally conic sections.

FIGURES 6 and 7 illustrate the approximate disposition of the kite with moderate wind conditions. In FIGURES 6 and 7, it can be noted that the keel-like section of the kite or the generally V-shaped disposition of the kite body in cross section is increased, as by increased movement of the central stiffener with respect to the general plane of the side stiffeners.

FIGURES 8 through 11 inclusive approximate the configuration of the kite in relatively heavy wind conditions, the central stiffener having flexed or moved to a more extreme position with respect to the general plane of the side stiffeners while the side stiffeners have been bent so as to reduce the effective lift area.

Figure 18:
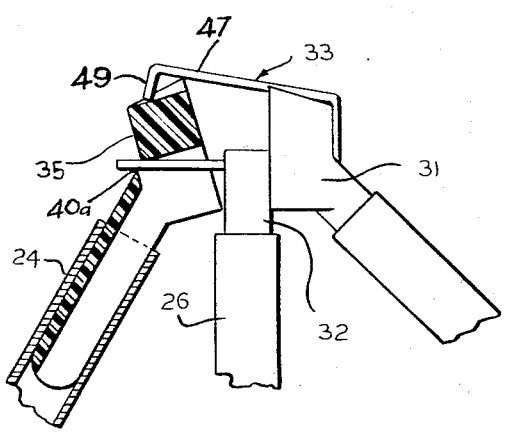
FIGURE 18 illustrates the assembly of FIGURE 17 and diagrammatically illustrates the action of the elements when undergoing collapse or disassembly.

The particular nose or apex connection for the kite protects the stiffeners against undue damage which might be incurred upon impact or other forces which tend to move the side stiffeners toward the medial stiffener. For example, a child may accidently attempt to move the sides of the kite towards the middle. Upon occurrence of such forces, the upper portion 47 of the retaining clip may yield resiliently as illustrated in FIGURE 18 so as to allow movement of the side elements 31 with respect to the center element 32. Thus, the connecting joint between the stiffeners may collapse and protect the kite.

The same connection allows for convenient assembly and disassembly of the kite into and from the assembled position of FIGURE 1. The kite may be easily disassembled simply by lifting the leg portion 47 from the slots 37 and removing the pin 33 from at least the center element and one side element. Thus, the side stiffeners 24, 25 and 26 may be folded alongside one another and the fabric of the kite rolled around the stiffeners for storage. The kite is easily assembled by reversing the process; namely, by inserting the hinging and retaining pin through the side elements and through the central element as illustrated in FIGURES 16 and 17.

This particular connecting construction allows the kite to be shipped in a relatively small package and also allows the user to easily assemble the same for flying.

Under some circumstances, it may be desirable to limit movement of the central stiffener so as to limit the diving characteristics of kites utilizing the principles of the invention as well as enhancing use of the kites as gliders. This is accomplished by use of a stop or abutment which allows movement of the central stiffener out of the general plane of the side stiffeners to the various V-shaped dispositions aforementioned while limiting movement in the opposite direction to a position substantially coplanar with the side stiffeners. For example, a stop may be positioned between the side stiffeners so that the central stiffener abuts the stop when in a position substantially coplanar with the side stiffeners. Such a stop may consist of a small wire fixed to the side stiffeners adjacent the nose piece, or fixed to the side stiffener legs of the nose piece so that the central stiffener may abut thereagainst. In other words, the stop may limit movement of the central stiffener to a position substantially coplanar with the side stiffeners while allowing movement of the central stiffener out of this plane and toward the user holding the control line, such pivoting movement of the central stiffener still allowing the various V-shaped dispositions aforementioned.

While the term "kite" has been used herein to describe the invention, it should be understood that this term is intended to embrace other forms which may incorporate the principles of the invention, such as gliders.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A kite including sheet material defining a kite body, said sheet material having a shape such as to define an apex at the top of the body, a central stiffening member attached to said sheet material and positioned to divide said kite body into half sections, additional stiffening members spaced from said central stiffening member on opposite sides thereof and fixed to said sheet material, said additional stiffening members being inclined to said central stiffening member, a tethering line fixed to said central stiffening member, and means for holding ends of said additional stiffening members joined together at said apex and in a common plane while allowing movement of said central stiffening member into and out of said plane and while allowing flexure of the additional stiffening members along substantially the entire lengths thereof.

2. A kite including sheet material defining the outline of a glider or kite of generally inverted V-shaped form, side stiffening strips attached to two side edges of said sheet material, said strips being inclined to one another and having ends connected together at an apex of said sheet material, a central stiffening strip attached to said sheet material and positioned to bisect the angle between said side strips, and means for holding said central strip and side strips together in said inclined and bisecting relation while allowing flexure of the substantial portions of said side strips to vary the distance between the other ends of said side strips thereby varying the effective lift area of the kite under varying wind conditions and movement of said central stiffening strip to and from a position substantially coplanar with said side stiffening strips and positions defining a generally V-shaped cross section with said side strips.

3. A kite including sheet material defining the outline of a glider or kite of generally inverted V-shaped form, side stiffening strips attached to two side edges of said sheet material, said strips being inclined to one another and being connected together at an apex of said sheet material, a central stiffening strip attached to said sheet material and positioned to bisect the angle between said side strips, and means for holding said central strip and side strips together at the apex while allowing flexure of the substantial portion of said side stiffening strips and movement of said central stiffening strip to and from a position substantially coplanar with said side stiffening strips and positions defining a generally V-shaped cross section with said side stiffening strips, said side strips being unrestrained except for said holding means and said sheet material.

4. A kite including sheet material defining the outline of a glider or kite of generally inverted V-shaped form, side stiffening strips attached to two side edges of said sheet material, said strips being inclined to one another and being connected together at an apex of said sheet material, a central stiffening strip attached to said sheet material and positioned to bisect the angle between said side strips, a control line fixed to said central strip, and means for holding said central strip and side strips together at the apex while allowing flexure of the substantial portion of said side stiffening strips and movement of said central stiffening strip to and from a position substantially coplanar with said side stiffening strips and positions defining a generally V-shaped cross section with said side stiffening strips, said sheet material and said holding means being the sole connection between said strips.

5. A kite including sheet material defining the outline of a glider or kite of generally inverted V-shaped form, side stiffening strips inclined to one another and attached to two edges of said sheet material, said side strips being connected together at an apex of said sheet material, a central stiffening strip attached to said sheet material and positioned to bisect the angle between said side strips, and means for holding said central strip and side strips together at the apex while allowing flexure of the substantial portion of said side strips and movement of said central stiffening strip to and from a position substantially coplanar with said side stiffening strips and positions defining a generally V-shaped cross section with said side stiffening strips, said holding means including means detachably connecting said strips together.

6. A kite including sheet material defining the outline of a glider or kite of generally V-shaped form, stiffening strips attached to two sides of said sheet material and being connected together at an upper apex of said sheet material, a central stiffening strip attached to said sheet material and positioned to bisect the angle between said other stiffening strips, and means for holding said stiffening strips together at the apex while allowing resilient flexure of the substantial portion of said side stiffening strips and movement of said central stiffening strip to and from a position substantially coplanar with said side stiffening strips and positions defining a generally V-shaped cross section with said side stiffening strips, said flexure allowing the lower ends of said side stiffening strips to move toward and away from one another to vary said V-shaped cross section and vary the effective lift area of the kite with varying wind forces.

7. The structure of claim 6 wherein said strips are in the form of hollow plastic tubes capable of resilient flexure from and to essentially rectilinear dispositions.

8. A kite including sheet material defining the outline of a glider or kite of generally inverted V-shaped form, stiffening strips attached to two sides of said sheet material and being connected together at an apex of said sheet material, a central stiffening strip attached to said sheet material and positioned to bisect the angle between said other stiffening strips, means for holding said strips together at the apex while allowing flexure of the substantial portion of said side stiffening strips and movement of said central stiffening strip to and from a position substantially coplanar with said side stiffening strips and to positions defining a variable, generally V-shaped cross section with said side stiffening strips, said material having apertures positioned alongside said central strip in vertically spaced relation, and a control line looped through at least one of said apertures, around said central strip and connected thereto, said control line being connected to said kite solely by connection to said central strip.

9. A kite including sheet material defining a kite body, a central stiffening strip connected to said sheet material and positioned to divide said body into half sections, side stiffening strips joined to said sheet material and positioned on opposite sides of said central stiffening strip and extending at angles with respect thereto, one end of each strip being positioned closely adjacent to ends of the other strips, and a multi-section connecting element joined to the said ends of said strips, said element including means for detachably holding the sections thereof together, one of said sections being connected to said central stiffening strip and being detachably connected to at least one other section, said other section being connected to at least one other side stiffening strip.

10. A kite including sheet material defining a kite body, a central stiffening strip connected to said sheet material and positioned to divide said body into half sections, side stiffening strips joined to said sheet material and positioned on opposite sides of said central stiffening strip and extending at angles with respect thereto, one end of each strip being positioned closely adjacent to ends of the other strips, and a multi-section connecting element joined to said ends of said strips, said element including means for detachably holding the sections thereof together, said element including one section joined to said central stiffening strip and other sections joined to said side stiffening strips, the section connected to said central stiffening strip being positioned between said other sections and being hingedly connected thereto.

11. A kite including sheet material defining a kite body, a central stiffening strip connected to said sheet material and positioned to divide said body into half sections, side stiffening strips joined to said sheet material and positioned on opposite sides of said central stiffening strip and extending at angles with respect thereto, one end of each strip being positioned closely adjacent to ends of the other strips, and a multi-section connecting element joined to the said ends of said strips, said element including means for detachably holding the sections thereof together, said element including one section joined to said central stiffening strip and other sections joined to said side stiffening strips, the section connected to said central stiffening strip being positioned between said other sections, said holding means including a pivot removably passed through said sections.

12. The structure of claim 11 wherein said pivot is in the form of a pin, said pin having a reversely bent portion overlying said other sections and received in slots in said other sections, said pin being of resilient wire-like material so as to allow a removable resilient, snap-fitting engagement within said slots, the pivot portion of said pin being passed through aligned openings in each of said sections.

13. The structure of claim 12 wherein said other sections have recesses for receiving said pin, said recesses being closed by a bearing surface for said pin at one side thereof and leading outwardly through the body at the other side thereof to allow movement of said pin out of said body, said reversely bent portion removably holding said pin against said bearing surfaces.

14. The structure of claim 11 wherein said stiffening strips are in the form of hollow tubes and portions of each of said sections are slidably received within said tubes and frictionally held therein, said portions having slots therein to allow slight compressibility of said portions when receiving said tubes.

15. A kite including sheet material defining the outline of a glider or kite, means defining side stiffeners joined to two sides of said sheet material, said means being such that the directions of the lengths of said stiffeners lead to a central point at the forward end of the kite, and a central stiffening strip attached to said sheet material and positioned to be directed toward said point while dividing said sheet material into two similar side sections, and means for holding portions of said central strip and said side stiffeners closest to said point together in said relation while allowing flexure of the substantial portions of the lengths of said side stiffeners to vary the distance between those ends of said side stiffeners furthest from said point, thereby varying the effective lift area of the kite under varying wind conditions, said holding means being formed and adapted to allow movement of said central stiffening strip to and from a position substantially coplanar with said side stiffeners and positions defining variable V-shaped cross sections with said side stiffeners in all positions of said side stiffeners.

16. A kite as defined in claim 15 wherein a control line is attached directly to said central strip without connection to the remainder of said kite.

References Cited by the Examiner

UNITED STATES PATENTS 3,153,877  10/1964  Effinger et al. ____ 244—153 X
3,194,520  7/1965  Kurkjian _____ 244—153

FOREIGN PATENTS 443,857  3/1936  Great Britain.

MILTON BUCHLER, *Primary Examiner.*

ALFRED E. CORRIGAN, *Examiner.*